United States Patent [19]

Otobe

[11] Patent Number: 4,829,439
[45] Date of Patent: May 9, 1989

[54] METHOD OF SELECTIVELY ADAPTING AN ELECTRONIC CONTROL UNIT FOR INTERNAL COMBUSTION ENGINES

[75] Inventor: Yutaka Otobe, Shiki, Japan

[73] Assignee: Honda Giken Kogyo Kabushiki Kaisha, Tokyo, Japan

[21] Appl. No.: 866,602

[22] Filed: May 23, 1986

[30] Foreign Application Priority Data

May 30, 1985 [JP] Japan .................................. 60-115264

[51] Int. Cl.⁴ ........................ F02D 41/02; F02D 35/00
[52] U.S. Cl. ............................. 364/431.04; 123/179 R; 364/425
[58] Field of Search ..................... 364/431.03, 431.09, 364/431.04, 425; 123/179 BG, 179 R, 179 A, 198 DA, 198 DB

[56] References Cited

U.S. PATENT DOCUMENTS 4,481,425 11/1984 Hori et al. ..................... 364/431.09
4,510,396 4/1985 Uchida et al. ............... 123/179 BG

FOREIGN PATENT DOCUMENTS 55137360 10/1987 Japan .

Primary Examiner—Felix D. Gruber
Assistant Examiner—V. N. Trans
Attorney, Agent, or Firm—Lyon & Lyon

[57] ABSTRACT

A method of selectively and automatically adapting an electronic control unit for internal combustion engines, depending upon whether the engine has a manual or an automatic transmission. When the engine has the manual transmission, a first signal indicative of a shift lever position assumed by the manual transmission is always generated. When the engine has the automatic transmission, a second signal indicative of the shift lever position is generated when the automatic transmission assumes a neutral position or a parking position, and the first signal is generated when the automatic transmission assumes a position other than the neutral position or the parking position. When it is determined that the second signal is being generated, second control data is selected to control the operation of the engine, and when it is determined that the first signal is being generated and at the same time the starter is operating, first control data is selected to control the engine operation.

6 Claims, 2 Drawing Sheets

4,829,439

METHOD OF SELECTIVELY ADAPTING AN ELECTRONIC CONTROL UNIT FOR INTERNAL COMBUSTION ENGINES

BACKGROUND OF THE INVENTION

This invention relates to a method of selectively adapting an electronic control unit for use in internal combustion engines, and more particularly to a method of this kind which enables the electronic control unit to be applied both to engines equipped with automatic transmissions and ones equipped with manual transmissions, without changing the structure of input ports, input circuits, etc. of the electronic control unit.

There is conventionally known an electronic control unit for controlling the operation of internal combustion engines, which is adaptable both to an engine installed in a vehicle equipped with an automatic transmission (hereinafter merely called "the AT vehicle") and one equipped with a manual transmission (hereinafter merely called "the MT vehicle"), in such a manner that control data applied for controlling the operation of an engine in the AT vehicle and control data applied for controlling the operation of an engine in the MT vehicle are both stored in storage means in the electronic control unit, and one of the two kinds of control data is selected for use, which corresponds to the type of a transmission associated with an engine to be controlled, thereby enhancing the mass productivity of the electronic control unit.

According to such a versatile type electronic control unit, in order to adapt the electronic control unit to the AT vehicle or to the MT vehicle, a changeover switch, the position of which determines the control data to be selected, is connected to one of input ports of a central processing unit (hereinafter called "the CPU") to supply a signal indicative of the position assumed by the changeover switch to the CPU, and the central processing unit selects one of the two kinds of control data that corresponds to the position assumed by the changeover switch.

The conventional electronic control unit therefore requires one of the input ports which are limited in number to be exclusively used for connection with the changeover switch, thus imposing a further limitation upon the number of input ports that can be used for inputting other engine operating parameters, etc. to the CPU.

SUMMARY OF THE INVENTION

It is the objective of the invention to provide a method of selectively adapting an electronic control unit for internal combustion engines, which is capable of discriminating whether the engine is installed in the AT vehicle or in the MT vehicle, without the special provision of a changeover switch and an input port for selection of control data for the AT vehicle or the MT vehicle.

According to the invention, there is provided a method of selectively adapting an electronic control unit for controlling operation of an internal combustion engine having a starter, and one of a manual transmission and an automatic transmission, wherein first control data and second control data used for controlling the operation of the engine are stored in storage means to be selected, respectively, when the engine has the manual transmission, and when the engine has the automatic transmission.

The method according to the invention is characterized by comprising the following steps: (1) when the engine has the manual transmission, always generating a first signal having a first level as a signal indicative of a shift lever position assumed by the manual transmission; (2) when the engine has the automatic transmission, (2-a) generating a second signal having a second level as the signal indicative of the shift level position when the automatic transmission assumes a neutral position or a parking position, and (2-b) generating the first signal having the first level when the automatic transmission assumes a position other than the neutral position or the parking position; (3) determining whether the first signal or the second signal is being generated as the signal indicative of the shift level position; (4) determining whether or not the starter is operating; (5) selecting the second control data when it is determined in the step (3) that the second signal is being generated; and (6) selecting the first control data when it is determined in the step (3) that the first signal is being generated and at the same time it is determined in the step (4) that the starter is operating.

Preferably, the first signal is supplied from a constant-voltage regulated power supply, when the engine has the manual transmission.

Also preferably, the first signal and the second signal are supplied from a shift lever sensor, depending upon the shift lever position assumed by the automatic transmission, when the engine has the automatic transmission.

The above and other objects, features and advantages of the invention will be more apparent from the ensuing detailed description taken in conjunction with the accompanying drawings.

DETAILED DESCRIPTION

The invention will now be described in detail with reference to the drawings showing embodiments thereof.

Figure 1:
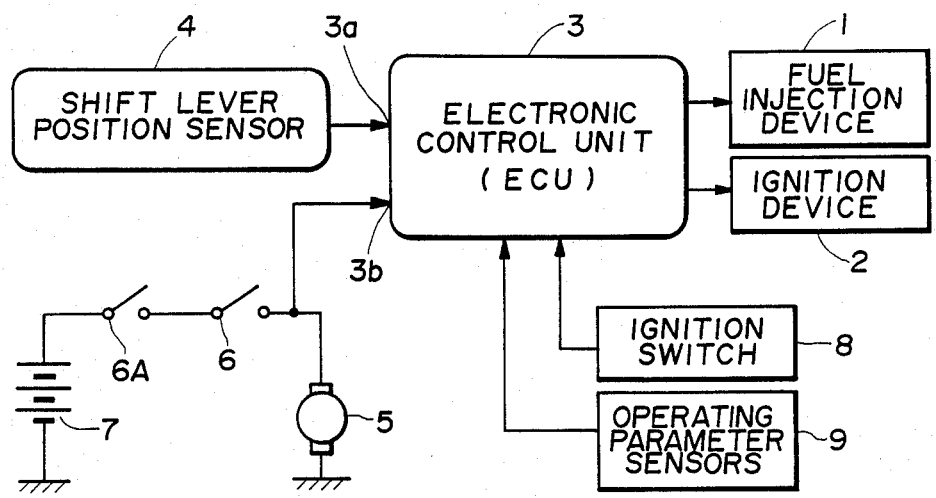
FIG. 1 is a block diagram showing the whole arrangement of an electronic control unit which controls the operation of an internal combustion engine installed in the AT vehicle, and its related parts, to which the method of the invention is applied.
Figure 2:
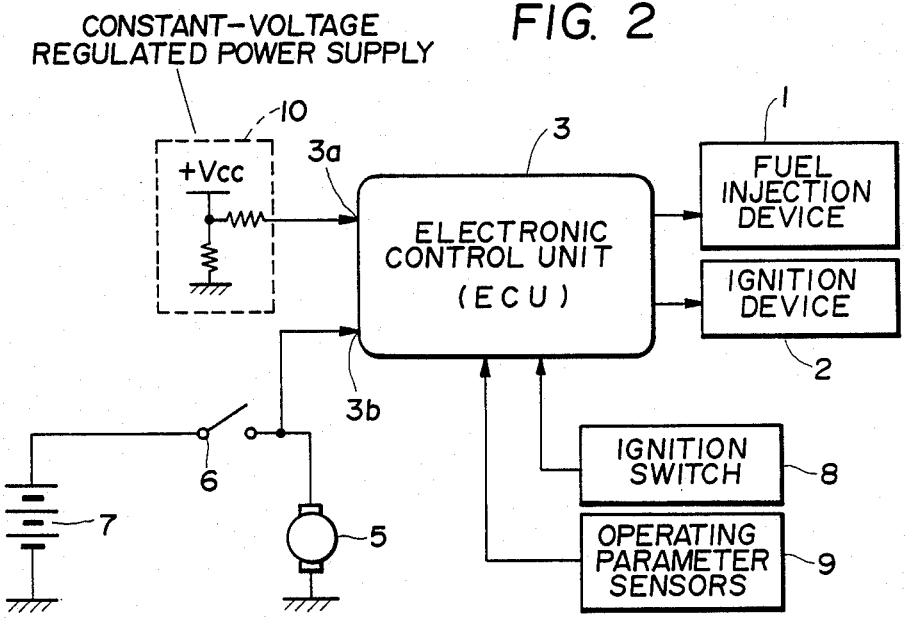
FIG. 2 is a block diagram showing the whole arrangement of an electronic control unit which controls the operation of an internal combustion engine installed in the MT vehicle, and its related parts, to which the method of the invention is applied.

FIGS. 1 and 2 show the whole arrangement of an electronic control unit and its related parts applied to the AT vehicle and the MT vehicle, respectively.

Referring first to FIG. 1, reference numeral 1 designates a fuel injection device for supplying fuel through injection to an internal combustion engine, not shown, which is connected to the output side of an electronic control unit (hereinafter called "the ECU") 3 and controlled thereby to supply the engine with a required quantity of fuel corresponding to a driving signal transmitted from the ECU 3. An ignition device 2 is also connected to the output side of the ECU 3 for igniting an air-fuel mixture injected by the fuel injection device 1 at crank angles of the engine dependent upon operating conditions of the engine and is also controlled by a control signal transmitted from the ECU 3.

A shift lever position sensor 4 is connected to an input port 3a of the ECU 3 to supply a signal indicative of a shift lever position assumed by the automatic transmission, not shown. For example, if the shift lever of the automatic transmission is in a neutral position or in a parking position (hereinafter these positions are generically called "the N range"), the shift lever sensor 4 outputs a low-level signal. And if the lever is in any of driving positions (hereinafter called "the D range") other than the N range, the shift lever sensor 4 outputs a high-level signal. The shift lever signal is supplied to the ECU 3 by way of the input port 3a.

A starter 5 is connected to a power supply 7 by way of a starter switch 6 and an inhibiter 6A. The junction of the starter 5 with the starter switch 6 is connected to an input port 3b of the ECU 3 such that the voltage difference between the starter switch 6 and the starter 5 is supplied to the ECU 3 by way of the input port 3b as a signal indicative of the operative state of the starter 5. The inhibiter 6A operates in response to the shift lever position (not showing) of the automatic transmission, in such a manner that when the shift lever is in the N range, the inhibiter 6A is closed. If the starter switch 6 is closed on this occasion, the starter can be actuated, and on the other hand, when the shift lever is in the D range, the inhibiter 6A is open. Therefore, even if the starter switch 6 is closed on this occasion, the starter 5 is inhibited from operating.

Further connected to the input side of the ECU 3 is an ignition switch 8 for supplying a signal indicative of the on and off position of the ignition switch. Further, connected to the input side of the ECU 3 are other operating parameter sensors 9 such as an engine rotational speed sensor and an intake air temperature sensor.

Referring next to FIG. 2 showing the electronic control unit applied to the MT vehicle, a constant-voltage regulated power supply 10 is connected to the input port 3a of the ECU 3, which always supplies the input port 3a with a high-level signal, in place of the shift lever position sensor 4 in FIG. 1.

As shown in FIG. 1, the starter 5 is connected to the power supply 7 by way of the starter switch 6 alone, while the inhibiter 6A appearing in FIG. 1 as being arranged between the starter switch 6 and the power supply 7 in the AT vehicle is omitted.

The elements and parts other than those described above are arranged in the same manner as shown in FIG. 1, and are designated by like reference numerals. Therefore, description thereof is omitted.

As will be described later, the ECU 3 determines which of the control data for the AT vehicle and for the MT vehicle is to be selected, depending upon the signal level of the input port 3a of the ECU 3 and the operative state of the starter 5, detects operating conditions of the engine, based upon signals indicative of the operative state of the starter 5 and the shift lever position of the transmission and parameter signals from various operating parameter sensors 9, determines the fuel quantity to be supplied to the engine and the ignition timing appropriate to the detected operating conditions of the engine in a known method, and drives the fuel injection device 1 and the ignition device 2 on the basis of the fuel quantity and the ignition timing thus determined.

The control data includes mapped data for setting basic values of the fuel quantity and the ignition timing in accordance with operating conditions of the engine, correction value tables for correcting the set basic values of the fuel quantity and the ignition timing with respect to the engine coolant temperature and other parameters, initial values of program variables, etc., all of which are stored in a ROM, not shown, in the ECU 3.

Figure 3:
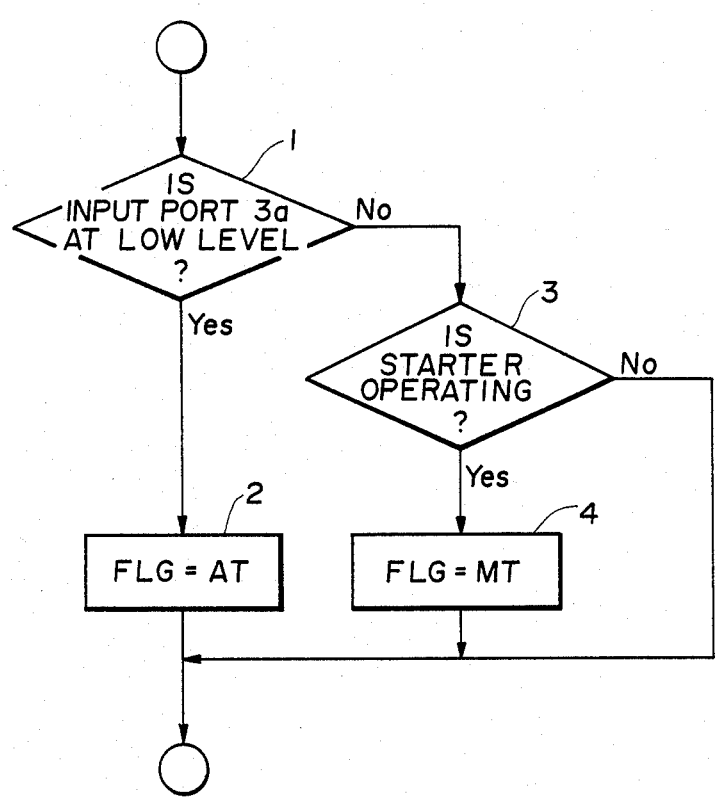
FIG. 3 is a flow chart showing a manner of discriminating which of the AT vehicle and the MT vehicle an engine to be controlled is installed in, according to the invention.

FIG. 3 shows a manner of discriminating which of the AT vehicle or the MT vehicle the engine is installed in, according to the invention, the program of which is executed within the ECU 3.

First, it is determined at the step 1 whether or not the signal inputted to the input port 3a of the ECU 3 shows a low level. If the answer to the question of the step 1 is affirmative or yes, the ECU 3 determines that the engine is installed in the AT vehicle, and sets a discrimination flag FLG to "AT". In the case of the engine being installed in the MT vehicle, the input port 3a of the ECU 3 is always supplied with a high-level signal, as noted before. Thus, if a low-level signal is detected at the step 1, it is immediately determined that the engine is in the AT vehicle. If the answer at the step 1 is negative or no, the program proceeds to the step 3 wherein a determination is made as to whether or not the starter 5 is in an operating state. It is detected that the signal inputted to the input port 3a shows a high level when the engine is used in the MT vehicle, or the shift lever is in the D range in the AT vehicle. However, as stated before, in the AT vehicle, so long as the signal inputted to the input port 3a of the ECU 3 shows a high level, that is, the shift lever is in the D range, the inhibiter 6A is open so that the starter 5 cannot be in an operating state. Therefore, if the answer at the step 3 is affirmative or yes, that is, if the starter 5 is in an operating state, it should be determined that the engine is in the MT vehicle. Then, the program proceeds to the step 4 wherein the discrimination flag FLG is set to "MT". If the answer at the step 3 is negative or no, that is, if the starter 5 is not in an operating state, the program is terminated without changing the flag value FLG.

Once the discrimination flag FLG has been set to "AT" or "T", the flag FLG maintains the same value so long as the step 2 or step 4 is not executed afterward to change the flag value FLG. Then, either control data for the AT vehicle or one for the MT vehicle is selected in accordance with the flag FLG value and applied to engine operation control.

As described above, according to the method of the invention, the electronic control unit can have its data change from one for the AT vehicle to one for the MT vehicle or vice versa merely by detecting the signal level of one of the ordinary input ports through which engine operating parameter signals are supplied to the CPU, rendering it unnecessary to especially provide an exclusive input port for connection with a changeover switch for selecting the control data for the AT vehicle or one for the MT vehicle, as well as rendering it possible to exactly discriminate whether the engine to be controlled is in the AT vehicle or in the MT vehicle.

What is claimed is:

1. A method of selectively adapting an electronic control unit to an internal combustion engine having a manual transmission or an internal combustion engine having an automatic transmission, for said electronic control unit to control operation of either of said engines to which it has been adapted, said engines each having a starter which is connected to said electronic control unit for supplying same with a starter signal indicative of operation of said starter during operation thereof, said electronic control unit having a storage means storing first control data for controlling the operation of said engine having a manual transmission and second control data for controlling the operation of said engine having an automatic transmission, the method comprising the steps of:

(1) when said electronic control unit is connected with said engine having a manual transmission, connecting first means to said electronic control unit for always generating a first signal having a first level irrespective of a shift lever position assumed by said manual transmission for said electronic control unit to be supplied with said first signal;

(2) when said electronic control unit is used with said engine having an automatic transmission, (2-a) connecting second means to said electronic control unit for generating a second signal having a second level when said automatic transmission assumes a neutral position or a parking position and generating said first signal when said automatic transmission assumes a position other than said neutral position or said parking position for said electronic control unit to be supplied with said second signal or said first signal, respectively and (2-b) providing third means connected to said electronic control unit responsive to the automatic transmission position for inhibiting operation of said starter when said automatic transmission assumes said position other than said neutral position or said parking position; and (3) causing said electronic control unit to determine whether said first signal or said second signal is being supplied thereto and at the same time determine whether or not said starter signal is being supplied thereto, and to select said second control data when said electronic control unit determines that said second signal is being supplied thereto and select said first control data when said starter signal and first signal are being supplied thereto at the same time.

2. A method as claimed in claim 1, wherein said first means comprises a constant-voltage regulated power supply.

3. A method as claimed in claim 2, wherein said second means comprises a shift lever sensor for sensing the shift lever position of said automatic transmission.

4. A method as claimed in claim 3, wherein said third means comprises a switch connected to said starter and being closable for allowing the starter to be actuated when said automatic transmission assumes said position other than said neutral position or said parking position.

5. A method as claimed in claim 1, wherein said second means comprises a shift lever sensor for sensing the shift lever position of said automatic transmission.

6. A method as claimed in claim 5, wherein said third means comprises a switch connected to said starter and being closable for allowing the starter to be actuated when said automatic transmission assumes said position other than said neutral position or said parking position.

* * * * *